(12) United States Patent
Sauerlaender et al.

(10) Patent No.: US 6,466,456 B2
(45) Date of Patent: Oct. 15, 2002

(54) CONVERTER WITH RESONANT CIRCUIT ELEMENTS FOR DETERMING LOAD TYPE

(75) Inventors: Georg Sauerlaender, Aachen; Thomas Duerbaum, Langerwehe, both of (DE); Hubert Raets, Landgraaf (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/913,476

(22) PCT Filed: Dec. 18, 2000

(86) PCT No.: PCT/EP00/13395

§ 371 (c)(1),
(2), (4) Date: Aug. 15, 2001

(87) PCT Pub. No.: WO01/45241

PCT Pub. Date: Jun. 21, 2001

(65) Prior Publication Data

US 2002/0126510 A1 Sep. 12, 2002

(30) Foreign Application Priority Data

Dec. 18, 1999 (DE) .......................... 199 61 228
Dec. 18, 1999 (DE) .......................... 199 61 227

(51) Int. Cl.$^7$ ............................................ H02M 3/335
(52) U.S. Cl. ................................ 363/16; 363/131
(58) Field of Search ................. 363/16, 97, 131

(56) References Cited

U.S. PATENT DOCUMENTS

| | | | | |
|---|---|---|---|---|
| 4,814,962 A | * | 3/1989 | Magalhaes et al. ........... 363/16 |
| 5,159,541 A | * | 10/1992 | Jain ............................ 363/131 |
| 5,208,738 A | * | 5/1993 | Jain ............................ 363/132 |
| 5,438,497 A | * | 8/1995 | Jain ............................ 363/132 |
| 5,475,580 A | * | 12/1995 | Noro ........................... 363/134 |
| 5,991,167 A | * | 11/1999 | Van Lerberghe ............ 363/127 |

FOREIGN PATENT DOCUMENTS

EP 0430358 A1 5/1991 ........... H05B/41/29

* cited by examiner

*Primary Examiner*—Shawn Riley
(74) *Attorney, Agent, or Firm*—Dicran Halajian

(57) ABSTRACT

A converter includes circuit elements for chopping a DC voltage, in which switch-on phases of the circuit elements are alternating. A circuit assembly with resonant elements is used for processing the chopped DC voltage and for producing an output voltage. The voltage present at one of the circuit elements is compared with a threshold in a dead time phase before the circuit element is switched on. The comparison result is used to determine whether an inductive or capacitive converter load is present. Alternatively, a differential quotient of the voltage present at one of the circuit elements during the dead time phase is used to determine whether an inductive or capacitive converter load is present.

11 Claims, 6 Drawing Sheets

CONVERTER WITH RESONANT CIRCUIT ELEMENTS FOR DETERMING LOAD TYPE

FIELD OF THE INVENTION

The invention relates to a converter comprising circuit elements for chopping a DC voltage, in which switch-on phases of the circuit elements are alternating, and comprising a circuit assembly with resonant circuit elements which is used for processing the chopped DC voltage and for producing an output voltage.

BACKGROUND OF THE INVENTION

Such load resonant converters preferably represent switching power supplies which are used for supplying DC voltage to a load connected to the output of the switching power supply. In such switching power supplies, an AC voltage present on the input is first rectified to obtain a converter input DC voltage. However, the invention also relates to converters to whose inputs a DC voltage is supplied directly from a DC voltage source. Such a converter can also be used for operation of gas discharge lamps. The converter input DC voltage is chopped by means of a bridge circuit comprising circuit elements. The chopped DC voltage is applied to a circuit assembly with resonant circuit elements i.e. with inductive and capacitive reactance elements, so that a substantially sinusoidal AC current flows in the circuit assembly. At least one inductive and at least one capacitive resonant circuit element are to be available. A load may be connected to the output of the circuit assembly and thus to the output of the converter. By adapting the switching frequency, load changes and input voltage variations are adapted to. Converters with resonant circuit elements i.e. resonant converters, enable the circuit elements to operate with high switching frequencies and thus relatively small-volume and light devices compared to the possible power output can be realized. When resonant converters are used, also a so-called zero-voltage switching operation (ZVS) is enabled with little circuit expenditure. ZVS operation is here understood to mean that circuit elements are switched on (brought to the conducting state) with a lowest possible voltage of the circuit element, preferably close to zero volts. In the ZVS mode the circuit assembly with the resonant circuit elements has an inductive input impedance considered from the side of the circuit elements. In the case of a ZVS mode, MOSFET transistors are customarily used as circuit elements. With converters realized in this way the operation with a capacitive load is to be avoided. Such a converter mode leads to increased switching losses and may even cause the destruction of converter circuit elements. Therefore, means are known to be provided for determining the type of converter load (inductive or capacitive) with such load resonant converters.

From EP 0 430 358 A1 is known a converter circuit arrangement for gas discharge lamps in which the type of converter load is determined in the way described above. The circuit arrangement includes a half bridge with circuit elements for chopping a DC voltage. On the output side of the half bridge is arranged a circuit assembly including resonant circuit elements, which assembly is used for supplying a voltage to a discharge lamp. Here too, operation with a capacitive converter load is to be avoided. For this reason the phase difference between the voltage applied to the circuit assembly and the current flowing into the circuit assembly is indirectly monitored by monitoring the current flowing into the circuit assembly.

SUMMARY OF THE INVENTION

It is an object of the invention for the converter defined in the opening paragraph to propose a further type of converter load monitoring, which type can be changed with the least possible circuit expenditure and the least possible measuring losses.

The object is achieved in that in a dead time phase before a circuit element is switched on, the voltage present on the circuit element is compared with a threshold and from the comparison result there is ascertained whether an inductive or capacitive converter load is present.

Expensive measurements of phase differences are avoided in this manner. Furthermore, only voltage measurements are necessary and no current measurements linked with losses. If necessary, in case of an undesired type of converter load the normal converter operation may, for example, be broken off and a new start sequence may be made. Determining the type of converter load may be effected very rapidly in this manner, so that undesired converter operating modes can be counteracted with counter measures very rapidly. Determining the type of converter load in accordance with the invention is also suitable for high switching frequencies.

In an embodiment of the invention the comparison with the threshold takes place in each dead time phase before either of the circuit elements is switched on. The time space up to the detection of an undesired converter operating mode is kept smallest possible in this manner.

The object is achieved in that, during a dead time phase, the derived value of the voltage present on a circuit element is determined and with the aid of the determined derived value there is ascertained whether an inductive or a capacitive converter load is present.

Alternatively, it is possible to include a time-average value for the derived value of the voltage present on a circuit element and use this time-average value for the comparison. Expensive measurements of phase differences are avoided in this manner. Furthermore, only voltage measurements are necessary and no current measurements linked with losses. If necessary, in case of an undesired type of converter load the normal converter operation may, for example, be broken off and a new start sequence may be made. Determining the type of converter load may be effected very rapidly in this manner, so that undesired converter operating modes can be counteracted with counter measures very rapidly. Determining the type of converter load in accordance with the invention is also suitable for high switching frequencies.

In an embodiment of the invention the evaluation of the derived value of the voltage present on a circuit element is made for each dead time phase and the comparison with the threshold is made before either of the circuit elements is switched on, i.e. the type of converter load is monitored cycle by cycle. The time space up to the detection of an undesired converter operation mode is kept shortest possible in this manner.

The invention also relates to an accordingly arranged control unit, more particularly an integrated circuit for controlling at least one of the converter circuit elements.

BRIEF DESCRIPTION OF THE DRAWINGS

Examples of embodiment of the invention will be further explained with reference to the drawings in which.

DETAILED DESCRIPTION OF THE INVENTION

Figure 1:
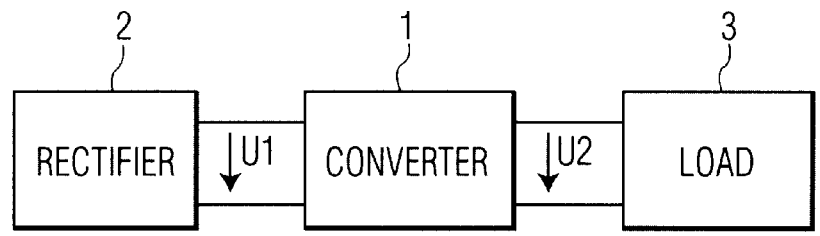
FIG. 1 shows a block diagram for a circuit arrangement including a resonant converter.

The block diagram shown in FIG. 1 shows a load resonant converter—here a switching power supply—with a circuit block 1 for converting an input DC voltage U1 into an output voltage U2—here a DC voltage—which output voltage U2 is used for supplying power to a load represented by a block 3. The input voltage U1 is generated here by rectifying an AC voltage of an AC voltage network which is the normal fashion for switching power supplies.

Figure 2:
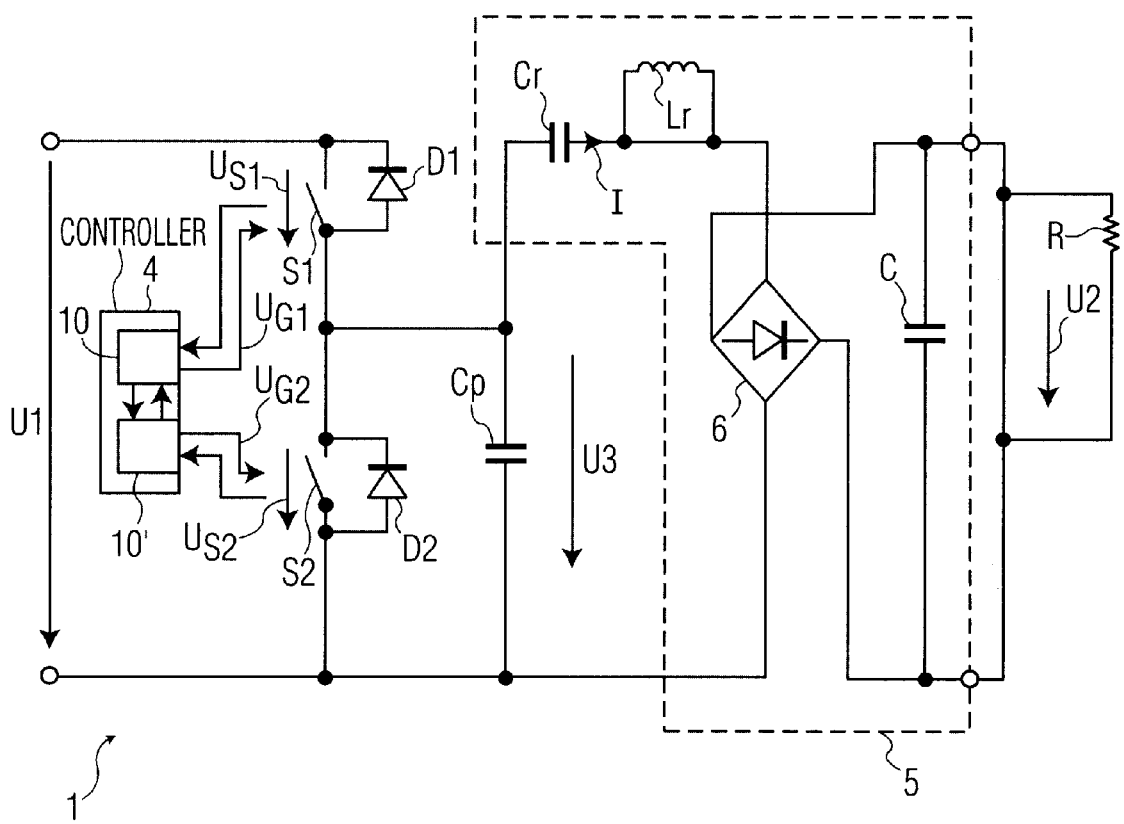
FIG. 2 shows the circuit structure of a resonant converter in accordance with the invention.

FIG. 2 shows in a more detailed manner the essential elements of the converter shown in FIG. 1. The input DC voltage U1 is here applied to a half bridge of series-arranged circuit elements S1 and S2, which chop the DC voltage U1. The circuit elements S1 and S2 are in the present case MOSFET transistors which have so-called body diodes D1 and D2 which are represented as a respective diode lying in an anti-parallel arrangement with the circuit elements S1 and S2. The circuit elements S1 and S2 are controlled by a control unit 4 which for this purpose also measures and evaluates the voltages $U_{S1}$ and $U_{S2}$ falling at the circuit elements S1 and S2. The control unit 4 contains for each circuit element its own control circuit, a first control circuit 10 being used for controlling the circuit element S1 and a second control circuit 10' for controlling the circuit element S2. The control unit 4 may be realized, for example, together with the control circuits 10 and 10' on a single integrated circuit (IC). The control circuits 10 and 10', however, can also be realized by means of separate ICs. By means of the control unit 4 or the control circuits 10 and 10', an automatic adaptation of the length of dead time phases is ensured, which will be further explained in the following.

Connected in parallel to the circuit element S2 is shown a capacitor Cp at which, when the converter 1 is in operation, a chopped DC voltage U3 falls. The capacitor Cp particularly combines the parasitic capacitances of the circuit elements S1 and S2 when they are realized as MOSFET transistors—like in the above example of embodiment. The capacitance Cp, however, may also include further additional capacitors. The chopped DC voltage U3 is applied to a circuit assembly 5, which includes resonant circuit elements and generates an output DC voltage U2. In the present case the circuit assembly 5 includes as resonant circuit elements a capacitance Cr and an inductance Lr which are connected in series. Between the series combination of the capacitance Cr and the inductance Lr and the capacitance Cp, in the direction of the converter output, there is a rectifier arrangement 6 which rectifies a current I flowing through the resonant circuit elements Cr and Lr and, as is usual, applies it to a smoothing capacitor C arranged on the output, from which the output DC voltage U2 can be tapped. In FIG. 2 the output DC voltage U2 is present on a load R, which is represented here as an ohmic resistance. Basically, the converter 1, however, could also be used for supplying an AC voltage instead of a DC voltage. In a case like that a rectification by a rectifier arrangement and a smoothing capacitor would not be necessary and the output voltage would be equal to the falling AC voltage at the rectifier arrangement 6 of the embodiment shown in FIG. 2.

The input DC voltage U1 is converted into the chopped DC voltage U3 by alternately switching the circuit elements S1 and S2 on (bringing into the conducting state) and off (bringing into the non-conducting state). If the switch S1 is on, the switch S2 is off. If the switch S2 is on, the switch S1 is off. Between the end of an on-phase of the switch S1 and the beginning of the on-phase of switch S2, there is always a dead time phase in which the two circuit elements S1 and S2 are off. Between an end of an "on" phase of the circuit element S2 and the beginning of the next "on" phase of the circuit element S1 there is always such a dead time phase. Providing such dead time phases enables ZVS operation (Zero Voltage Switching). The length of the "on" and "off" time phases of the circuit elements S1 and S2 is then adjusted by means of the control unit 4, which will be further explained with reference to FIGS. 5 and 8. By adapting the switching frequency, a constant output voltage is ensured even with load variations and variations of the input voltage.

Figure 3:
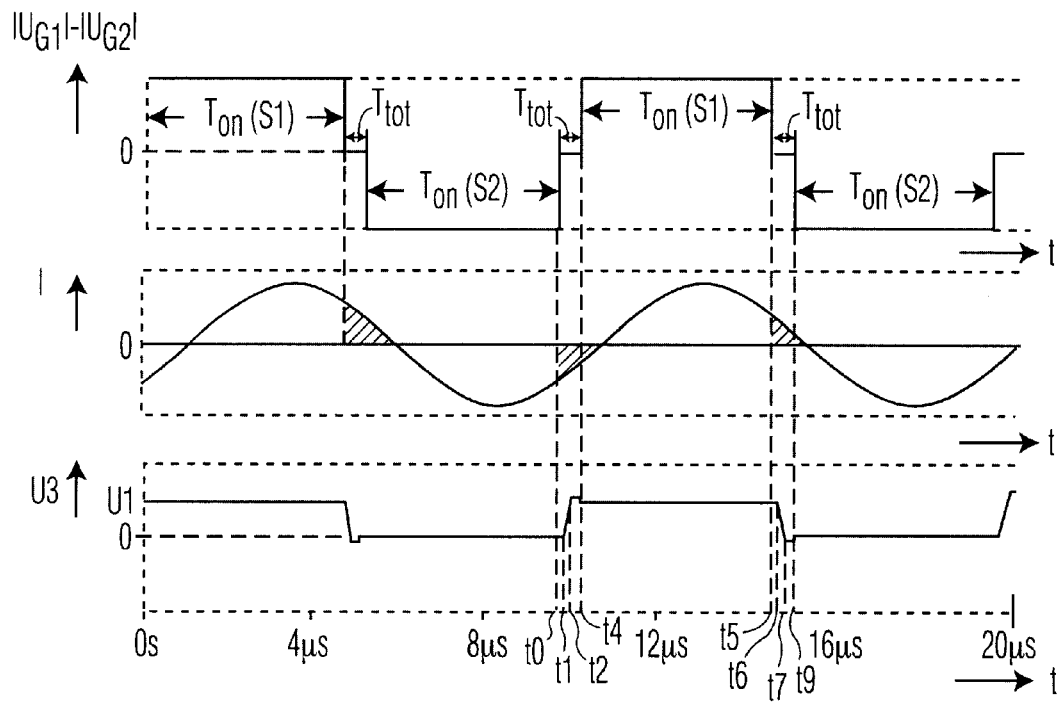
FIG. 3 shows timing diagrams for an inductive load.

The top diagram of the three shown in FIG. 3 represents the difference $|U_{G1}|-|U_{G2}|$ of the value of the control voltage $U_{G1}$ present on the circuit element S1 and of the value of the control voltage $U_{G2}$ present on the circuit element S2. The control voltages used as control signals for controlling the circuit elements S1 and S2 represent respective gate voltages of the MOSFET transistors. If the plotted difference of the values of the control voltages equals zero, there is a dead time phase which is referred to as $T_{ot}$. If the circuit element S1 is set to the "on" state because a suitable control voltage $U_{G1}$ is applied to the control input of the circuit element S1, there are time spaces referred to as $T_{on}(S1)$. In these time spaces the control voltage $U_{G2}$ equals zero and thus the circuit element S2 is switched off. The time spaces in which the circuit element S2 is "on" and the circuit element S1 is "off", are referred to as $T_{on}(S2)$. During these time spaces the control input of the circuit element S2 is supplied with a non-zero control voltage $U_{G2}$, which causes the circuit element S2 to be switched on. Within these time spaces, the control voltage $U_{G1}$ is equal to zero. The middle diagram in FIG. 3, shows the waveform as a function of time of the current flowing through the resonant circuit elements Cr and Lr. Finally, in the bottom diagram of FIG. 3 is shown the waveform as a function of time of the voltage U3 applied to the parasitic capacitance Cp. The time axes of the three diagrams with the time t shown have all the same scale.

In the following is explained by way of example the change between the on and off-states of the circuit elements S1 and S2 with respect to which states the operations during a switch between the respective switching cycles are elucidated. At the instant t0 the control voltage $U_{G2}$ is set to zero to cause the circuit element S2 to be switched "off". This leads to a discharge operation on the gate electrode of the MOSFET transistor used for realizing the circuit element S1. Until this discharging operation has ended, however, the circuit element S2 is still conducting, so that the negative current continues to flow through the circuit element S2 at this instant. From instant t1 onwards the circuit element S2 is finally switched off, so that current can no longer flow through it. The current I flowing on because of the energy stored in the inductance Lr now causes from instant t1 onwards the capacitance Cp to be charged and thus the voltage U3 to rise. At the instant t2 the voltage U3 has finally reached the value of the input DC voltage U1, so that the diode D1 starts being conductive. From this instant onwards it is ensured that the circuit element S1 is switched on with a switching voltage $U_{S1}$ of about 0 volts (ZVS with the diode forward voltage). Shortly after the instant t2—at the instant t4—the circuit element S1 is switched on because a respective control voltage $U_{G2}$ is applied thereto. Thus a time space $T_{on}(S1)$ is commenced with a circuit element S1 that is switched on and a circuit element S2 that is switched off.

At the instant t5 this time space $T_{on}(S1)$ is ended in that the control voltage $U_{G1}$ is set to zero. This in turn leads to a discharge operation on the gate electrode of the MOSFET transistor used for realizing the circuit element S1. At the instant t6 this discharge operation has been terminated so far that the circuit element S1 starts blocking, that is, goes to the off-state, so that the current I positive at this instant leads to discharging the capacitance Cp and thus to a falling voltage U3. At the instant t7 the voltage U3 has reached the zero value, so that from this instant onwards the diode D2 starts being conductive and the circuit element S2 can be switched on with a switching voltage $U_{S2}$ of about 0 volts (with the diode forward voltage), which really occurs at instant t9, shortly afterwards, after a respective control voltage $U_{G2}$ has been applied. From this instant onwards a time space $T_{on}$ (S2) begins, in which the circuit element S2 is switched on and the circuit element S1 is switched off.

Both between the instants t0 and t4 and between the instants t5 and t9 there is a so-called dead time phase during which both the control voltage $U_{G1}$ and the control voltage $U_{G2}$ are equal to zero and thus control voltages acting as switch-off control signals are present. The dead time phases $T_{tot}$ are set such that a ZVS operation is possible. In the I(t) diagram the hatched areas represent a measure for the energy available for charging/discharging the capacitance Cp. In the case shown in FIG. 3 the available energy is enough.

The operating state shown by waveforms in FIG. 3 represents, for example, a case of inductive load i.e. the current I lags relative to the first harmonic of the voltage U3. In such an operating state a ZVS operation (Zero Voltage Switching) of the converter 1 is possible.

Figure 4:
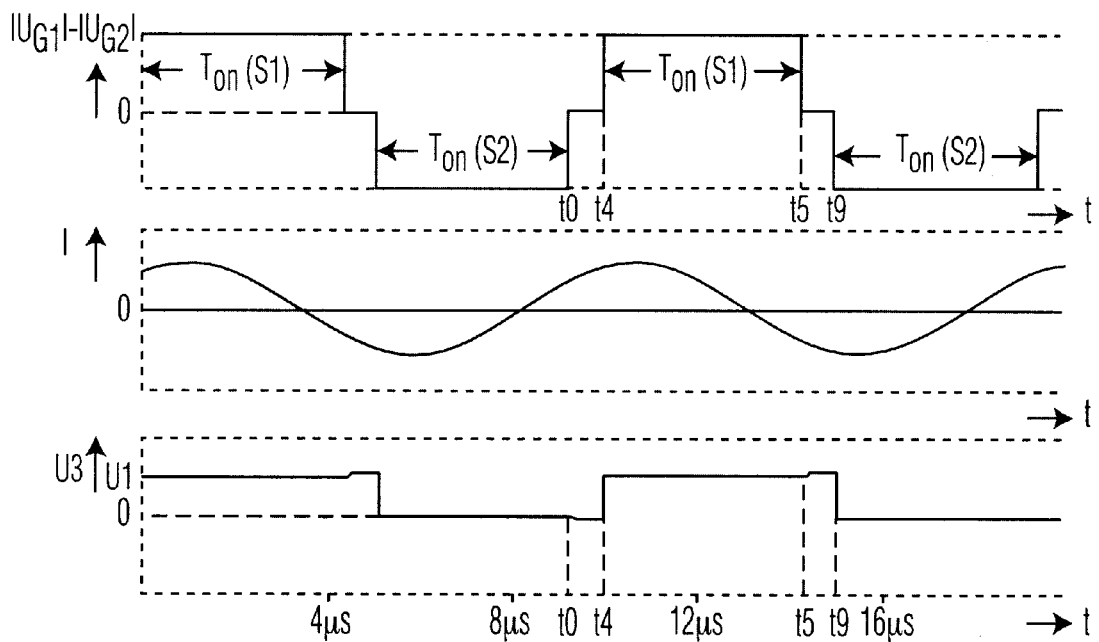
FIG. 4 shows timing diagrams for a capacitive load.

FIG. 4 shows in contrast respective waveforms by way of example for a case of capacitive load. In such an operating state the current I leads relative to the first harmonic of the voltage U3. In the case of a capacitive load a ZVS operation of the converter 1 is no longer possible. At the instant t0 in FIG. 4 the circuit element S2 is switched off. The current I is then positive, so that a gradual charging on the capacitance Cp up to the voltage U1 (as is the case in FIG. 3 between the instants t1 and t2) is impossible because of the current I continuously being transferred by the energy stored in the inductance Lr. In that case, the voltage U3 is abruptly increased from the zero value to the value U1 at the instant t4 at which the circuit element S1 is switched on, that is to say, the full voltage U1 is still applied to this circuit element when S1 is switched on. Accordingly, switching the circuit element S2 on in the case of a capacitive load is not effected without any voltage, because at instant t9, at which the circuit element S2 is switched on, the voltage U3 still has the value U1 and abruptly falls to the zero value. Since in the case of the capacitive load, high switching losses (correspondingly large values for the product from the current I and the circuit element voltages $U_{S1}$ and $U_{S2}$ respectively, at the instants t4 and t9) develop in the circuit elements S1 and S2 arranged here as MOSFET transistors, which losses may even lead to the circuit elements being destroyed, this operating state is to be avoided. How this happens will be further explained hereinafter with reference to FIG. 7.

Figure 5:
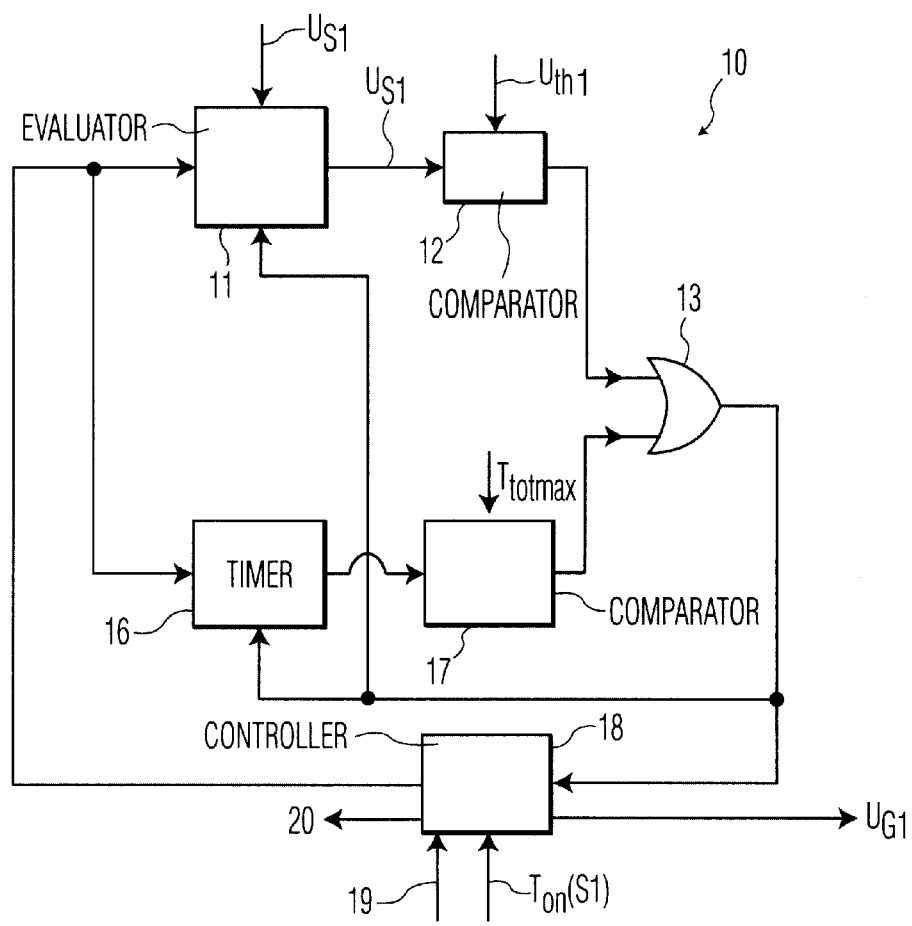
FIG. 5 shows a block diagram of a control circuit arrangement for controlling circuit elements.

FIG. 5 shows as a block diagram the basic structure of the control circuit 10 used for controlling the circuit element S1. A function block 11 combines the measuring and evaluation unit which transfers during the dead time phases $T_{tot}$ which lie immediately before the switch-on phases $T_{ton}(S1)$ of the circuit element S1, the measured voltage $U_{S1}$ or a signal equivalent to this voltage to a comparator device 12, which compares this applied signal with a first threshold $U_{th1}$. When the first threshold is reached, a set signal corresponding to a logic "one" is applied to an OR gate 13.

Figure 8:
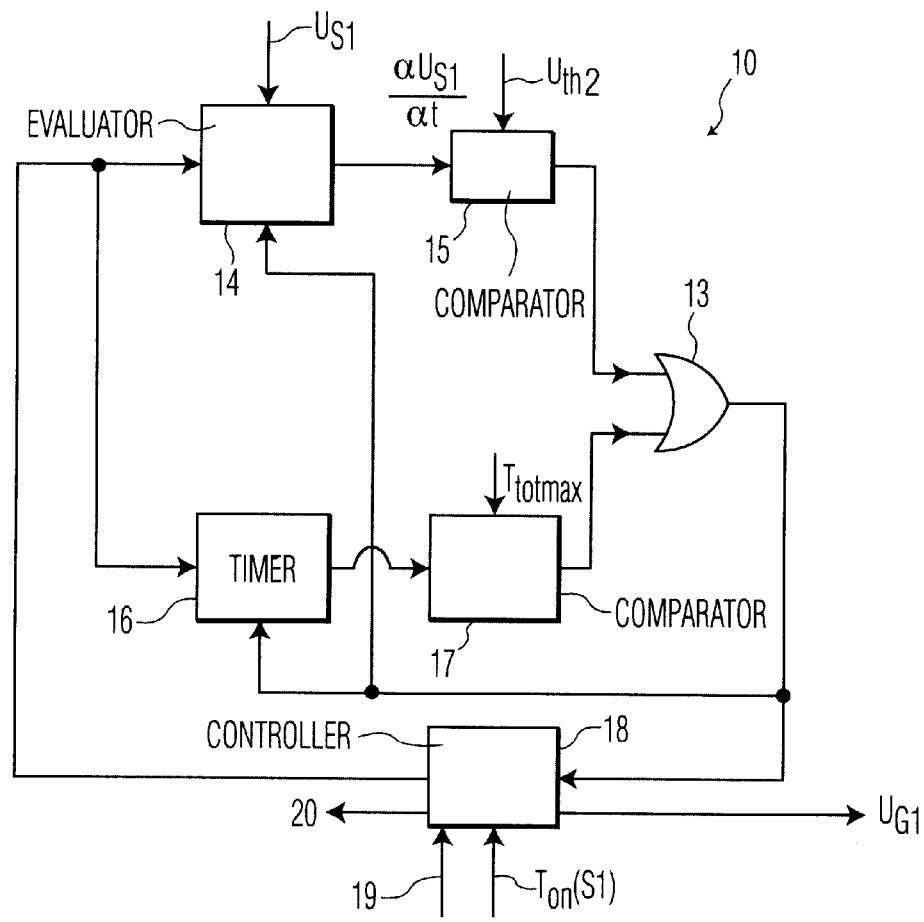
FIG. 8 shows a block diagram of a second embodiment of a control circuit arrangement for controlling circuit elements.

The control circuit 10 further includes circuit elements combined by a function block 14 shown in FIG. 8, which circuit elements determine differential quotients of the circuit element voltage $U_{S1}$ present during the dead time phases $T_{tot}$ immediately preceding the switch-on phases $T_{on}$ (S1) and apply this voltage to a second comparator device 15 which compares the differential quotients $dU_{S1}/dt$ with a second threshold $U_{th2}$. When the second threshold $U_{th2}$ is reached, a set signal corresponding to a logic "one" is applied to the OR gate 13.

In addition, the control circuit 10 includes a timer 16 which starts at the beginning of a dead time phase $T_{tot}$, which immediately precedes a switch-on phase $T_{on}(S1)$ and applies a corresponding time signal to a comparator device 17 which compares this applied time signal with a predefinable maximum permissible dead time phase length $T_{tot,max}$. When this maximum dead time phase length is reached, the comparator device 17 applies a set signal that corresponds to a logic "one" to the OR gate 13.

If the output of the OR gate 13 produces a logic "one", this effects the beginning of a switch-on phase $T_{on}$ (S1) or the end of the respective previous dead time phase $T_{tot}$. If there is a logic "one" on the output of the OR gate 13, the timer 16 is reset and circuit means combined by a function block 18 provide, for a predefinable switch-on phase $T_{on}$ (S1), the control signal $U_{G1}$ that acts as a switch-on signal and is applied to the control input of the circuit element S1. Furthermore, the function block 18 combines switching means which activate the measuring and evaluation devices in the function blocks 11 and 14 and the timer 16 after a switch-on phase $T_{on}$ (S2) has ended. A respective activating signal, which is used as an enable signal for the measuring and evaluation devices of the function blocks 11 and 14 and as a trigger signal for the timer, is applied by the function block 18 to the respective function blocks 11, 14 and 16 at that instant. This happens at the instant at which a signal 19 is applied to the function block 18 at the end of a switch-on phase $T_{on}$ (S2), which signal 19 is generated by a second control circuit 10' which is used for controlling the circuit element and is arranged similarly to the control circuit 10. Accordingly, at the end of a switch-on phase $T_{on}$ (S1), also the function block 18 or the control circuit 10 respectively, generates signal 20 for the corresponding second control circuit 10'.

Figure 6:
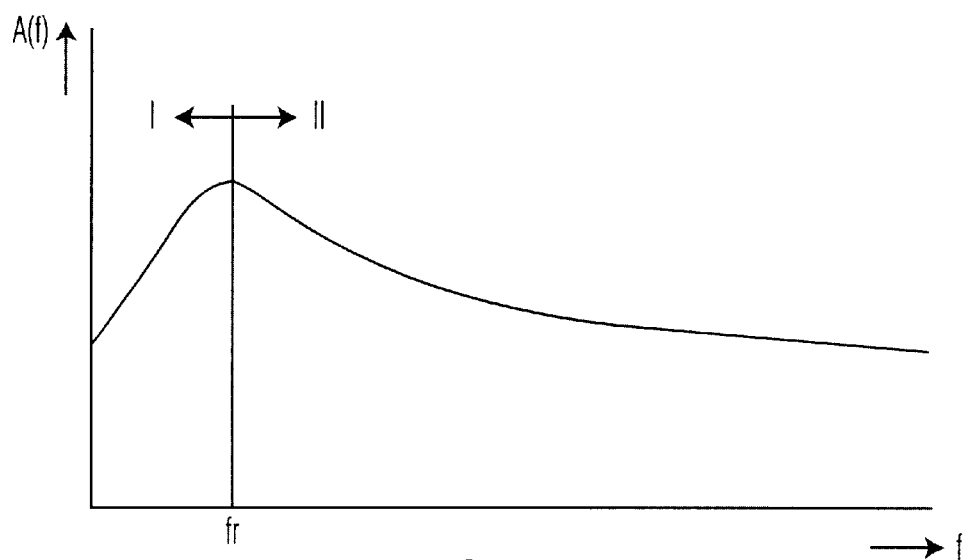
FIG. 6 shows a transmission function relative to the load side of the resonant converter.

FIG. 6 shows a transmission function A(s) which expresses the pattern of the quotient U2/U3 as a function of the frequency f. At the resonant frequency $f_r$ of the converter 1, which frequency is determined, in essence, by the capacitance Cr and the inductance Lr, the transmission function A(f) has its maximum. At frequencies f lower than $f_r$ (area I) there is a capacitive load. Frequencies higher than $f_r$ (area II) on the other hand correspond to converter modes of operation with an inductive converter load. At frequencies f above the resonant frequency $f_r$ the converter can accordingly be used. From FIG. 6 is apparent that the capacitive mode of operation (area I) is to be avoided also because the customarily used control mechanisms are no longer effective for controlling the converter output voltage U2. For in the area I, contrary to the area II, the value of A(f) diminishes with a diminishing frequency, so that instead of a negative feedback like in area II (rising value of A(f) with a falling frequency f), there is a positive feedback, which prevents a control of the output voltage U2.

Figure 7:
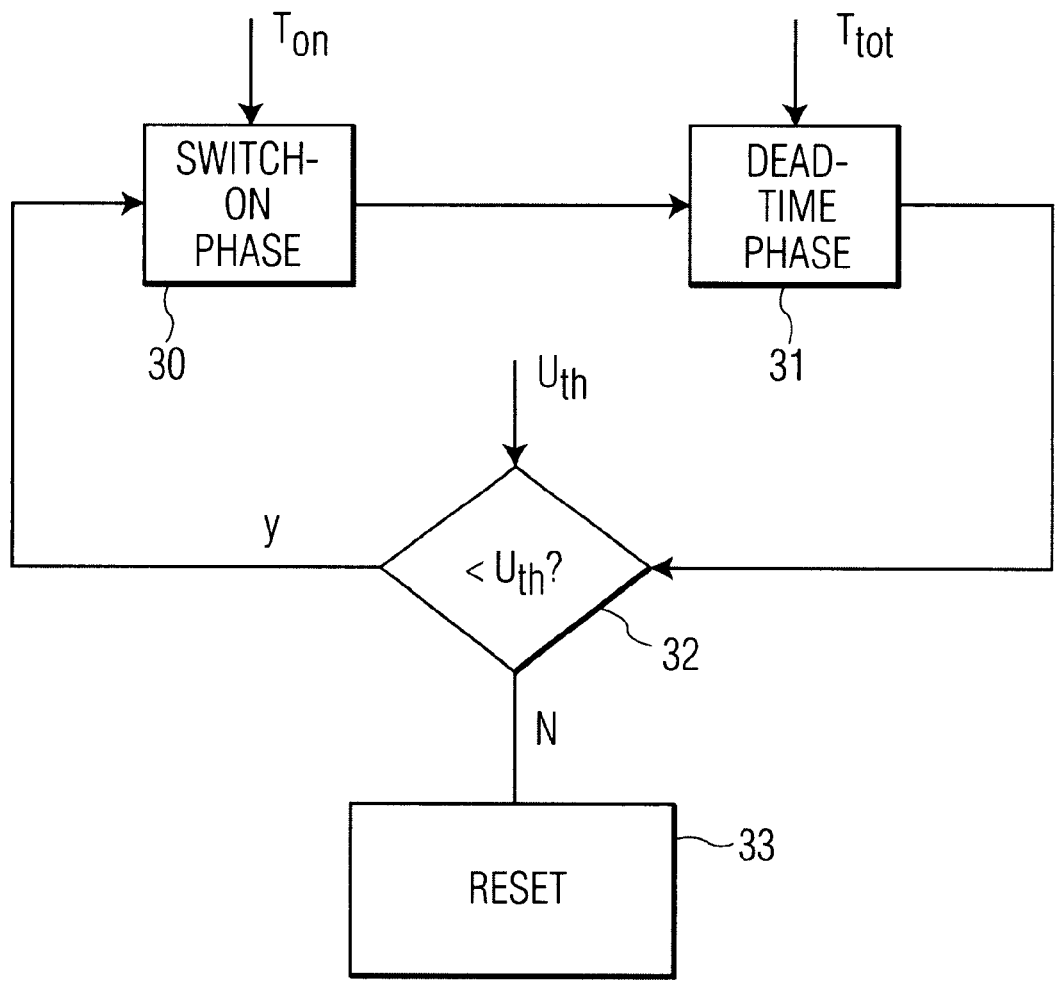
FIG. 7 shows a flow chart in explanation of a converter operation in accordance with the invention.

The flow chart shown in FIG. 7 shows how the control unit 4 monitors (by means of circuit arrangements not further shown) whether an inductive load or a capacitive load occurs when the converter 1 is used. The monitoring is preferably effected cycle by cycle to ensure as continuous a monitoring as possible. Block 30 represents one of the successive switch-on phases ($T_{on}$(S1) or $T_{on}$(S2)) of the circuit elements S1 and S2. At the end of each dead time phase $T_{tot}$ represented by block 31 and following a switch-on phase a test is made whether the voltage on the one of the two circuit elements that is to be switched on next is smaller than a predefinable threshold $U_{th}$. With the converter 1 shown in FIG. 2, the two switching voltages $U_{S1}$ and $U_{S2}$ (=U3) are measured. The switching voltage $U_{S1}$, however, could also be indirectly derived from the voltage U1 and from the voltage $U_{S2}$ or U3 respectively as a difference U1–U3. The threshold is selected such that it lies between the forward voltage of the diodes D1 and D2 and the value of the voltage U1, because in case of an inductive load the voltage on the circuit elements S1 and S2 when the circuit elements are switched on is equal to the diode forward voltage of the respective parallel-arranged diode (see FIG. 3) and in the case of a capacitive load the respective switch-on voltage of the circuit element is equal to the value of the voltage U1. If in the step represented by block 32 it is established that the respective circuit element voltage is smaller than the threshold $U_{th}$ (branch Y), the converter mode is continued with the next switch-on phase $T_{on}$ (block 30). If in this step, however, it is established that the respective circuit element voltage exceeds a threshold $U_{th}$ (branch N), which corresponds to the case of a capacitive load, the normal operation of the converter is broken off and a new starting sequence of the converter is carried out in normal fashion (block 33).

FIG. 8 shows as a block diagram the basic structure of a second embodiment of the control circuit 10 used for controlling the circuit element S1. A function block 14 combines the measuring and evaluation unit which transfers, during the dead time phases T$_{on}$ (S1) of the circuit element S1, the measured voltage $U_{S1}$ or a signal equivalent to this voltage to a comparator device 15, which compares this applied signal with a second threshold $U_{th2}$. When the second threshold is reached, a set signal corresponding to a logic "one" is applied to an OR gate 13.

In addition, the control circuit 10 includes a timer 16 which starts at the beginning of a dead time phase $T_{tot}$, which immediately precedes a switch-on phase $T_{on}$(S1) and applies a corresponding time signal to a comparator device 17 which compares this applied time signal with a predefinable maximum permissible dead time phase length $T_{tot,max}$. When this maximum dead time phase length is reached, the comparator device 17 applies a set signal that corresponds to a logic "one" to the OR gate 13.

If the output of the OR gate 13 produces a logic "one", this effects the beginning of a switch-on phase $T_{on}$ (S1) or the end of the respective previous dead time phase $T_{tot}$. If there is a logic "one" on the output of the OR gate 13, the timer 16 is reset and circuit means combined by a function block 18 provide for a predefinable switch-on phase $T_{on}$ (S1) that the control signal $U_{G1}$ acting as a switch-on signal is applied to the control input of the circuit element S1. Furthermore, the function block 18 combines switching means which activate the measuring and evaluation devices in the function blocks 11 and 14 and the timer 16 after a switch-on phase $T_{on}$ (S2) has ended. A respective activating signal, which is used as an enable signal for the measuring and evaluation devices of the function blocks 11 and 14 and as a trigger signal for the timer, is applied by the function block 18 to the respective function blocks 11, 14 and 16 at that instant. This happens at the instant at which a signal 19 is applied to the function block 18 at the end of a switch-on phase $T_{on}$ (S2), which signal 19 is generated by a second control circuit 10' which is used for controlling the circuit element and is arranged similarly to the control circuit 10. Accordingly, at the end of a switch-on phase $T_{on}$ (S1), also the function block 18 or the control circuit 10 respectively, generates signal 20 for the corresponding second control circuit 10'.

Figure 9:
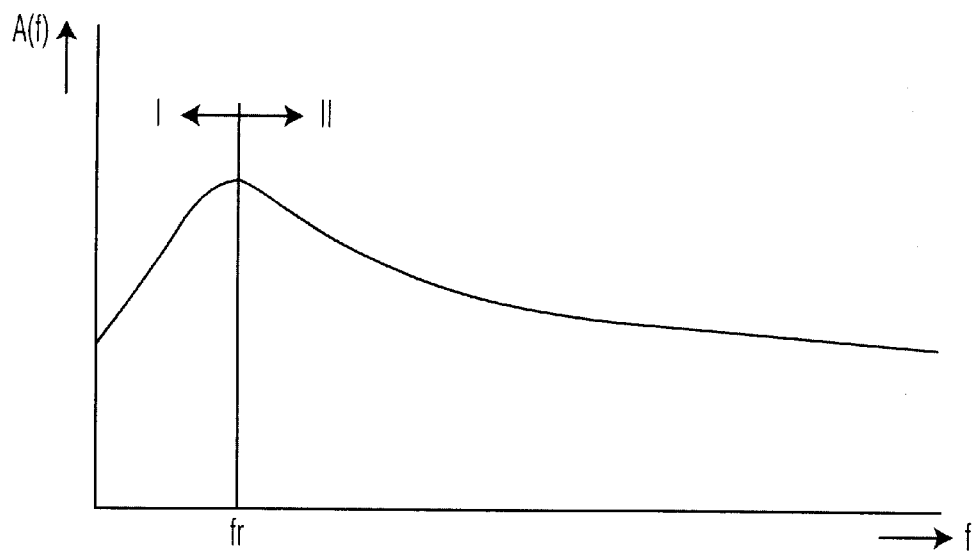
FIG. 9 shows a transmission function plotted against the frequency for a constant load resistance for the second embodiment.

FIG. 9 shows a transmission function A(s) which expresses the pattern of the quotient U2/U3 as a function of the frequency f. At the resonant frequency $f_r$ of the converter 1, which frequency is determined, in essence, by the capacitance Cr and the inductance Lr, the transmission function A(f) has its maximum. At frequencies f lower than $f_r$ (area I) there is a capacitive load. Frequencies higher than $f_r$ (area II) on the other hand correspond to converter modes of operation with an inductive converter load. At frequencies f above the resonant frequency $f_r$ the converter can accordingly be used. From FIG. 6 is apparent that the capacitive mode of operation (area I) is to be avoided also because the customarily used control mechanisms are no longer effective for controlling the converter output voltage U2. For in the area I, contrary to the area II, the value of A(f) diminishes with a diminishing frequency, so that instead of a negative feedback like in area II (rising value of A(f) with a falling frequency f), there is a positive feedback, which prevents a control of the output voltage U2.

Figure 10:
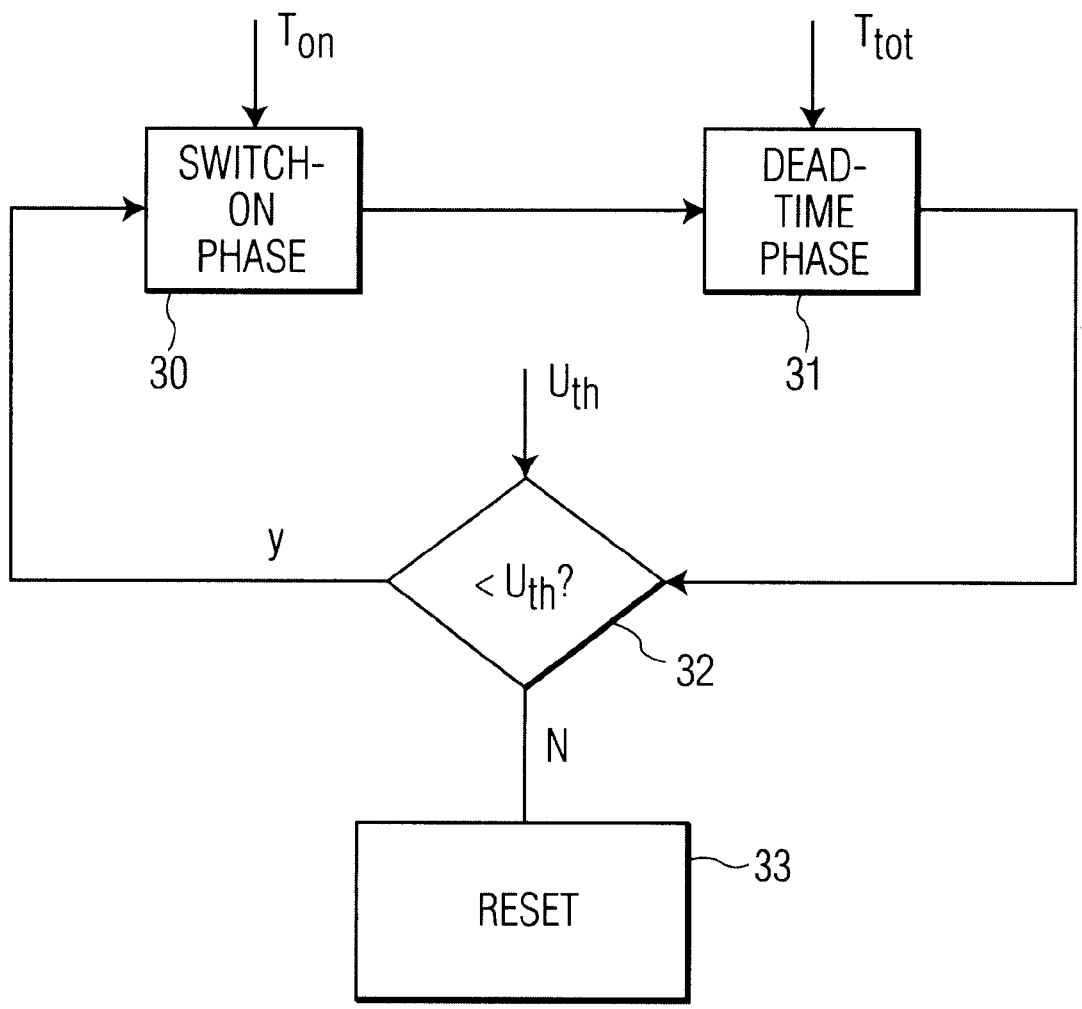
FIG. 10 shows a flow chart in explanation of a converter operation in accordance with the second embodiment of the invention.

The flow chart shown in FIG. 10 shows how the control unit 4 monitors (by means of circuit arrangements not further shown) whether an inductive load or a capacitive load occurs when the converter 1 is used. The monitoring is preferably effected cycle by cycle to ensure as continuous a monitoring as possible. Block 30 represents one of the successive switch-on phases ($T_{on}$(S1) or $T_{on}$(S2)) of the circuit elements S1 and S2. During a dead time phase $T_{tot}$ shown by block 31 the derived value (differential quotient) of the voltage present on a circuit element, more particularly for each dead time phase and accordingly for each renewed switching on of a circuit element S1 or S2. From FIGS. 3 and 4 it becomes apparent that with an inductive load (FIG. 3) the pattern of this derived value deviates from the pattern with a capacitive load (FIG. 4) during the time spaces in the dead time phases in which both circuit elements S1 and S2 are non-conducting (i.e. here in the time spaces, for example, from t0 to t4 and from t5 to t9). This is used for detecting whether an inductive or a capacitive load is present. The threshold $U_{th}$ is accordingly set to a value from the range between the derived voltage values to be expected of the circuit elements for inductive or capacitive load respectively, during these time spaces.

Particularly the characteristic fall or rise respectively of the voltage U3 can be used in the time spaces between t0 and t1 or between t5 and t6 respectively (and the respective preceding and following time spaces) in the case of the capacitive load (FIG. 4). This leads to a very fast detection of the type of load. Another possibility consists of evaluating the characteristic rise or fall respectively of the voltage U3 in the time spaces between t1 and t2 or between t6 and t7 respectively (and the respective preceding and following time spaces) that occurs with an inductive load (FIG. 3).

To counteract erroneous measurement results due to high frequency voltage components, the measured derived value is also low-pass filtered while the time constant of the filter is to be low compared to the length of the dead time phase.

Alternatively, in lieu of the direct comparison of the derived value of circuit element voltages with a threshold $U_{th}$, there could also be made a comparison of a threshold $U_{th}$ with a time-average value of the respective switch element voltage in dead time phases. The formation of an average value is linked with a signal smoothing. More particularly the average value is evaluated for the time spaces between t1 and t2 and between t6 and t7 respectively (and the respective preceding and following time spaces). The average value, however, could also be formed for respective segments of these time spaces.

With the converter 1 shown in FIG. 2 the two switching voltages $U_{S1}$ and $U_{S2}$ (=U3) are evaluated. The switching voltage $U_{S1}$, however, could also be determined indirectly from the voltage U1 and the voltage $U_{S2}$=U3 as a difference U1–U3.

If in the step represented in block 32 it is established that the respective switch element voltage is smaller than the threshold $U_{th}$ (branch Y), the converter mode is continued with the next switch-on phase $T_{on}$ (block 30). If in this step, however, it is established that the respective switch element voltage exceeds the threshold $U_{th}$ (branch M), which correspond to the case of capacitive load, the normal operation of the converter is terminated and the new starting sequence of the converter is carried out in normal fashion (block 33).

What is claimed is:

1. A converter comprising:
   circuit elements for switching a DC voltage to form a switched DC voltage, wherein switch-on phases of the circuit elements are alternating; and
   a circuit assembly with resonant circuit elements which is used for processing the switched DC voltage and for producing an output voltage;
   wherein in a dead time phase before one of said circuit elements is switched on, a voltage present on one of said circuit elements is compared with a threshold value to form a comparison result, said comparison result being used to determine whether an inductive or capacitive converter load is present.

2. A converter as claimed in claim 1, wherein the comparison with the threshold value is made in each said dead time phase before the circuit elements are switched on.

3. A control unit for controlling at least one of circuit elements of a converter which are used for switching a direct voltage to form a switched direct voltage, wherein switch-on phases of the circuit elements are alternating, said converter including a circuit assembly with resonant circuit elements which are used for processing the switched direct voltage and for producing an output voltage;
   wherein, in a dead time phase before said at least one of the circuit elements is switched on, the control unit compares a voltage present on said at least one of the circuit elements with a threshold value to form a comparison result, the control unit determining from the comparison result whether an inductive or capacitive converter load is connected to said converter.

4. A converter comprising:
   circuit elements for switching a DC voltage to form a switched DC voltage, wherein switch-on phases of the circuit elements are alternating, and
   a circuit assembly with resonant circuit elements which is used for processing the switched DC voltage and for producing an output voltage;
   wherein during a dead time phase, a derived value of a voltage present on one of said circuit elements is determined, the derived value being used to determined whether an inductive or a capacitive converter load is present.

5. A converter as claimed in claim 4, wherein the derived value is compared with a threshold value by a comparator to form a comparison result, the comparison result being used to determine whether the converter load is inductive or capacitive.

6. A converter as claimed in claim 4, wherein during a dead time phase, a time-average value is determined for the derived value, and a comparison with a threshold value is made by a comparator to form a comparison result, the comparison result being used to determine whether the converter load is inductive or capacitive.

7. A converter as claimed in claim 5, wherein the comparison with the threshold value is made each time before the circuit elements are switched on.

8. A control unit for controlling at least one of circuit elements of a converter which are used for switching a DC voltage to form a switched DC voltage, wherein the switch-on phases of the circuit elements are alternating; and wherein the converter comprises a circuit assembly with resonant circuit elements, said circuit assembly processing the switched DC voltage and producing an output voltage; and
   wherein during a dead time phase, the control unit determines a derived value of a voltage present on said at least one of the circuit elements; said derived value being used to determine whether an inductive or capacitive converter load is present.

9. A converter comprising:
   switches which receive a DC voltage and alternately switch to output a switched DC voltage;
   an output circuit which processes the switched DC voltage and produces an output voltage for a load; and
   a controller which controls switching of said switches, said controller comparing a threshold value with one of a derived value and a voltage present on one switch of said switches during a dead time phase before said one switch is switched on to form a comparison result, wherein said controller is configured to determine whether said load is inductive or capacitive from said comparison result.

10. The converter of claim 9, wherein said derived value is a differential quotient of said voltage present on said one switch during said dead time phase.

11. The converter of claim 9, wherein said output circuit include resonant circuit elements.

* * * * *